US010057470B2

(12) United States Patent
Kim et al.

(10) Patent No.: US 10,057,470 B2
(45) Date of Patent: Aug. 21, 2018

(54) ELECTRONIC DEVICE AND PHOTOGRAPHING METHOD THEREOF

(71) Applicant: Samsung Electronics Co., Ltd., Gyeonggi-do (KR)

(72) Inventors: Sangeun Kim, Gyeonggi-do (KR); Kiyoung Kwon, Gyeonggi-do (KR); Kyunghwan Kim, Gyeonggi-do (KR); Jihoon Park, Gyeonggi-do (KR); Taeyoon An, Gyeonggi-do (KR); Taewon Um, Seoul (KR); Inho Oh, Gyeonggi-do (KR); Jaewoong Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/290,481

(22) Filed: Oct. 11, 2016

(65) Prior Publication Data

US 2017/0104902 A1 Apr. 13, 2017

(30) Foreign Application Priority Data

Oct. 8, 2015 (KR) ........................ 10-2015-0141764

(51) Int. Cl.
*H04N 5/225* (2006.01)
*H04N 5/232* (2006.01)
*G02B 7/02* (2006.01)
*G02B 7/182* (2006.01)

(52) U.S. Cl.
CPC ............. *H04N 5/2254* (2013.01); *G02B 7/02* (2013.01); *G02B 7/1822* (2013.01); *H04N 5/2257* (2013.01); *H04N 5/23293* (2013.01)

(58) Field of Classification Search
CPC .............. H04N 5/2254; H04N 5/2257; H04N 5/23293; G02B 7/02; G02B 7/1822
See application file for complete search history.

(56) References Cited

U.S. PATENT DOCUMENTS

| | | | | |
|---|---|---|---|---|
| 6,184,923 | B1 * | 2/2001 | Miyazaki | A61B 1/00096 348/75 |
| 6,532,035 | B1 * | 3/2003 | Saari | G02B 13/005 348/14.01 |
| 7,051,938 | B2 * | 5/2006 | Johnson | H04N 5/2259 235/462.33 |
| 7,586,538 | B2 * | 9/2009 | Cho | H04M 1/0218 348/374 |
| 8,010,154 | B2 * | 8/2011 | Chambers | H04M 1/0264 455/556.1 |

(Continued)

FOREIGN PATENT DOCUMENTS

| | | |
|---|---|---|
| KR | 10-2001-0046654 | 6/2001 |
| KR | 10-2004-0094133 | 11/2004 |
| KR | 10-2015-0029418 | 3/2015 |

*Primary Examiner* — Lin Ye
*Assistant Examiner* — Chriss Yoder, III
(74) *Attorney, Agent, or Firm* — The Farrell Law Firm, P.C.

(57) ABSTRACT

An electronic device and a method for photographing an image in a multi-direction is provided. The electronic device includes a case, including a display, an image sensor, and a processor, and a crown disposed on the case, the crown including a camera window. The crown is rotatable and when the crown is rotated, the camera window is rotated, and light passing through the camera window is transmitted to the image sensor.

20 Claims, 18 Drawing Sheets

(56) References Cited

U.S. PATENT DOCUMENTS

| | | | |
|---|---|---|---|
| 8,654,236 B2* | 2/2014 | Shiozaki | H04N 5/23229 |
| | | | 348/208.2 |
| 9,563,234 B2* | 2/2017 | Popalis | G06F 1/163 |
| 2007/0211042 A1* | 9/2007 | Kim | G04C 3/005 |
| | | | 345/184 |
| 2015/0041289 A1* | 2/2015 | Ely | H01H 3/122 |
| | | | 200/4 |
| 2016/0231883 A1* | 8/2016 | Zambetti | G06F 1/169 |

* cited by examiner

ELECTRONIC DEVICE AND PHOTOGRAPHING METHOD THEREOF

PRIORITY

This application claims priority under 35 U.S.C. § 119(a) to Korean Patent Application No. 10-2015-0141764 filed in the Korean Intellectual Property Office on Oct. 8, 2015, the content of which is incorporated herein by reference.

BACKGROUND

1. Field of the Disclosure

The present disclosure relates generally to an electronic device that takes multi-directional photos by using a rotatable crown, and further relates to a photographing method thereof.

2. Description of the Related Art

With the development of digital technology, various electronic devices that adopt a camera function have been launched. These electronic devices are in a mobile convergence phase in which the electronic devices encompass functions of other electronic devices, as well as their traditional functions.

Typically, the electronic devices may adopt a call function (such as voice call or video call), a message transmission and reception function, such as short message service (SMS)/multimedia message service (MMS) or e-mail, an electronic organizer function, a photographing function, a broadcast reproducing function, a video reproducing function, a music player function, an Internet function, a messenger function, and a social networking service (SNS) function.

According to the mobile convergence trend, users utilize photos that are taken by using a camera function of the electronic device in relation to the messenger function and the SNS function, as well as storing the photos that are taken by using the electronic device adopting the camera function in the gallery.

Wearable computers or wearable devices refer to electronic devices that are designed to be worn on the body, such as glasses, watches, or clothing. Since such a wearable device has excellent portability, the user can conveniently utilize photos that are taken by using the camera function of the wearable device, without the need to find and prepare a separate electronic device for taking photos.

Conventionally, a wearable device adopting a camera function has limitations on its size or volume because it is to be worn on the user. It is difficult for the existing wearable device to include a camera having a swivel structure, which is connected to a main body of the device by using an flexible printed circuit board (FPCB). Therefore, since the wearable device adopting a camera function has a single photographing direction or has a fixed photographing direction, the user must twist his or her wrist in order to take a photo at a desired angle.

SUMMARY

The present disclosure has been made to address at least the above-mentioned problems and/or disadvantages and to provide at least the advantages described below.

Accordingly, an aspect of the present disclosure is to provide a method for photographing an image in a multi-direction by rotating a reflector in order to enhance the convenience of using an electronic device, such as the wearable device adopting a camera function, to photograph an image.

Accordingly, another aspect of the present disclosure is to allow a user to photograph an image in a multi-direction by using a rotatable crown on an electronic device, which prevents the user from twisting his wrist to photograph the image, and to provide a method for correcting a display direction of the photographed image.

In accordance with an aspect of the present disclosure, an electronic device for photographing an image in a multi-direction is provided. The electronic device includes a case including a display, an image sensor, and a processor, and a crown disposed on the case, the crown including a camera window. The crown is rotatable and when the crown is rotated, the camera window is rotated, and light passing through the camera window is transmitted to the image sensor.

In accordance with another aspect of the present disclosure, a photographing method of an electronic device is provided. The method includes photographing an image, correcting a display direction of the photographed image, and displaying the corrected image.

BRIEF DESCRIPTION OF THE DRAWINGS

The above and other objects, functions, and advantages of certain embodiments of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
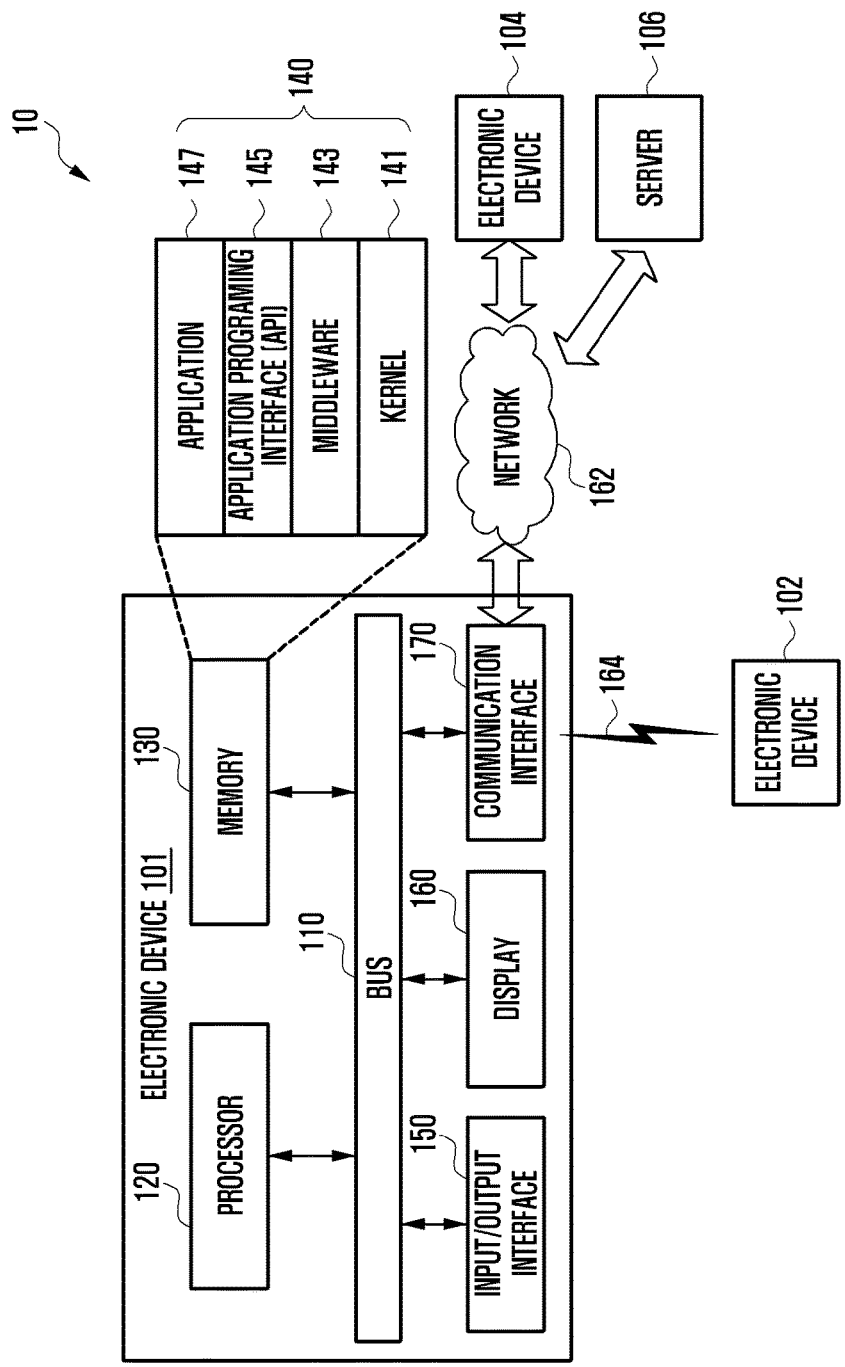
FIG. 1 is a block diagram of an electronic device in a network environment, according to an embodiment of the present disclosure.

Hereinafter, the present disclosure will be described with reference to the accompanying drawings. Although specific embodiments are illustrated in the drawings and related detailed descriptions are discussed in the present disclosure, the present disclosure may have various modifications and several embodiments. However, various embodiments of the present disclosure are not limited to a specific implementation form and it should be understood that the present disclosure includes all changes, equivalents and/or substitutes included in the spirit and scope of the present disclosure. In connection with descriptions of the drawings, similar components are designated by the same reference numeral.

The term "include", which may be used in describing various embodiments of the present disclosure, refers to the existence of a corresponding disclosed function, operation or component which can be used in various embodiments of the present disclosure and does not limit one or more additional functions, operations, or components.

As used herein, the term "include" or "have" may be construed to denote a certain characteristic, number, step, operation, constituent element, component or a combination thereof, but should not be construed to exclude the existence of or a possibility of addition of one or more other characteristics, numbers, steps, operations, constituent elements, components or combinations thereof.

As used herein, the expressions "A or B" and "at least one of A or/and B" include any or all of combinations of words listed together. For example, the expression "A or B" or "at least A or/and B" may include A, may include B, or may include both A and B.

The expressions "1", "2", "first", "second", etc. used herein, may modify various components of the various embodiments but does not limit the corresponding components. For example, the above expressions do not limit the sequence and/or importance of the components. The expressions may be used for distinguishing one component from other components. For example, a first user device and a second user device indicate different user devices although both the first user device and the second user device are user devices. For example, without departing from the scope of the present disclosure, a first structural element may be referred to as a second structural element. Similarly, the second structural element may be referred to as the first structural element.

When a component is "coupled to" or "connected to" another component, the component may be directly coupled or connected to the other component or a new component may exist between the component and the other component. In contrast, when a component is "directly coupled to" or "directly connected to" the other component, a new component does not exist between the component and the other component.

The terms used in describing various embodiments of the present disclosure are only examples for describing a specific embodiment and do not limit the various embodiments of the present disclosure. Singular forms are intended to include plural forms unless the context clearly indicates otherwise.

Unless defined differently, all terms used herein, which include technical terminologies or scientific terminologies, have the same meanings as understood by a person skilled in the art to which the present disclosure pertains. Such terms as those defined in a generally used dictionary are to be interpreted to have the meanings equivalent to the contextual meanings in the relevant field of art, and are not to be interpreted to have ideal or excessively formal meanings, unless clearly so defined in the present disclosure.

An electronic device according to an embodiment of the present disclosure may be a device including a communication function. For example, the electronic device may be one or a combination of a smart phone, a tablet personal computer (PC), a mobile phone, a video phone, an e-book reader, a desktop PC, a laptop PC, a netbook computer, a personal digital assistant (PDA), a camera, a wearable device (for example, a head-mounted-device (HMD) such as electronic glasses, electronic clothes, and electronic bracelet, an electronic necklace, an electronic appcessary, an electronic tattoo, and a smart watch.

The electronic device may be a smart home appliance having a communication function. The smart home appliance may include at least one of a television (TV), a digital versatile disk (DVD) player, an audio player, an air conditioner, a cleaner, an oven, a microwave oven, a washing machine, an air cleaner, a set-top box, a TV box (for example, Samsung HomeSync™, Apple TV™, or Google TV™), a game console, an electronic dictionary, an electronic key, a camcorder, and an electronic frame.

The electronic device may include at least one of various types of medical devices (for example, a magnetic resonance angiography (MRA) device, a magnetic resonance imaging (MRI) device, computed tomography (CT) device, a scanner, an ultrasonic device, etc.), a navigation device, a global positioning system (GPS) receiver, an event data recorder (EDR), a flight data recorder (FDR), a vehicle infotainment device, electronic equipment for a ship (for example, a navigation device, a gyro compass, etc.), an avionics device, a security device, a head unit for a vehicle, an industrial or home robot, an automatic teller machine (ATM), and a point of sale (POS) device.

The electronic device may include at least one of furniture or a part of a building/structure, an electronic board, an electronic signature receiving device, a projector, and various types of measuring devices (for example, a water meter, an electricity meter, a gas meter, a radio wave meter and the like) including a camera function. The electronic device may be one or a combination of the above described various devices. Further, the electronic device may be a flexible device. It is apparent to those skilled in the art that the electronic device according to various embodiments of the present disclosure is not limited to the above described devices.

Herein, the term "user" may refer to a person who uses an electronic device or a device (for example, an artificial intelligence electronic device) which uses an electronic device.

FIG. 1 is a block diagram of an electronic device in a network environment, according to an embodiment of the present disclosure.

Referring to FIG. 1, a network environment 10 including an electronic device 101, according to an embodiment of the present disclosure, is provided. The electronic device 100 includes a bus 110, a processor 120, a memory 130, an input/output interface 150, a display 160 and a communication interface 170.

The bus 110 is a circuit connecting the above described components and transmitting communication (for example, a control message) between the above described components.

The processor 120 receives commands from the other components of the electronic device 101 (for example, the memory 130, the input/output interface 150, the display 160, the communication interface 170) through the bus 110, analyzes the received commands, and executes calculations or data processing according to the analyzed commands.

The memory 130 stores commands or data received from the processor 120 or the other components (for example, the input/output interface 150, the display 160, or the communication interface 170) or generated by the processor 120 or the other components. The memory 130 may include programming modules 140, for example, a kernel 141, middleware 143, an application programming interface (API) 145, and an application 147. Each of the aforementioned programming modules may be implemented by software, firmware, hardware, or a combination thereof.

The kernel 141 controls or manages system resources (for example, the bus 110, the processor 120, or the memory 130) used for executing an operation or function implemented by the remaining other programming modules, for example, the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. Further, in operation requests received from the application 147, the middleware 143 performs a control for the operation requests (for example, scheduling or load balancing) by using a method of assigning a priority, by which system resources (for example, the bus 110, the processor 120, and the memory 130) of the electronic device 101 can be used, to the application 147.

The API 145 is an interface by which the application 147 can control a function provided by the kernel 141 or the middleware 143 and includes, for example, at least one interface or function (for example, command) for a file control, a window control, image processing, or a character control.

The input/output interface 150 can receive a command and/or data from a user, and transfer the received command and/or data to the processor 120 and/or the memory 130 through the bus 110.

The display 160 can display an image, a video, and/or data to a user. The display 160 may display a graphical user interface image for interaction between the user and the electronic device 101. The graphical user interface image may include interface information to activate a function for correcting a color of the image to be projected onto the screen. The interface information may be in the form of, for example, a button, a menu, or an icon.

The communication interface 170 connects communication between the electronic device 100 and the external device (for example, the first external electronic device 102, the second external electronic device 104 or server 106). For example, the communication interface 170 may access a network 162 through wireless or wired communication to communicate with the second external electronic device 104 or the server 106. The communication interface 170 may communicate with the first electronic device through short range communication or wired communication.

The wireless communication includes at least one of the short range communication 164 and cellular communication. The short range communication 164 includes, for example, WiFi, Bluetooth (BT), near field communication (NFC), and global navigation satellite system (GNSS). GNSS may include at least one of a global positioning system (GPS), global navigation satellite system (Glonass), Beidou navigation satellite system (Beidou), and Galileo, the European global satellite-based navigation system. Hereinafter, the term "GPS" may be used interchangeably with the term "GNSS", The cellular communication includes, for example, long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM).

The wired communication may include at least one of, a Universal Serial Bus (USB), a High Definition Multimedia Interface (HDMI), Recommended Standard 232 (RS-232), and a Plain Old Telephone Service (POTS).

The server 106 supports driving the electronic device 101 by performing at least one operation (or function) implemented by the electronic device 101. For example, the server 106 may include a communication control server module that supports the communication interface 170 implemented in the electronic device 101. For example, the communication control server module may include at least one of the components of the communication interface 170 to perform on behalf of at least one operation performed by the communication interface 170.

Figure 2:
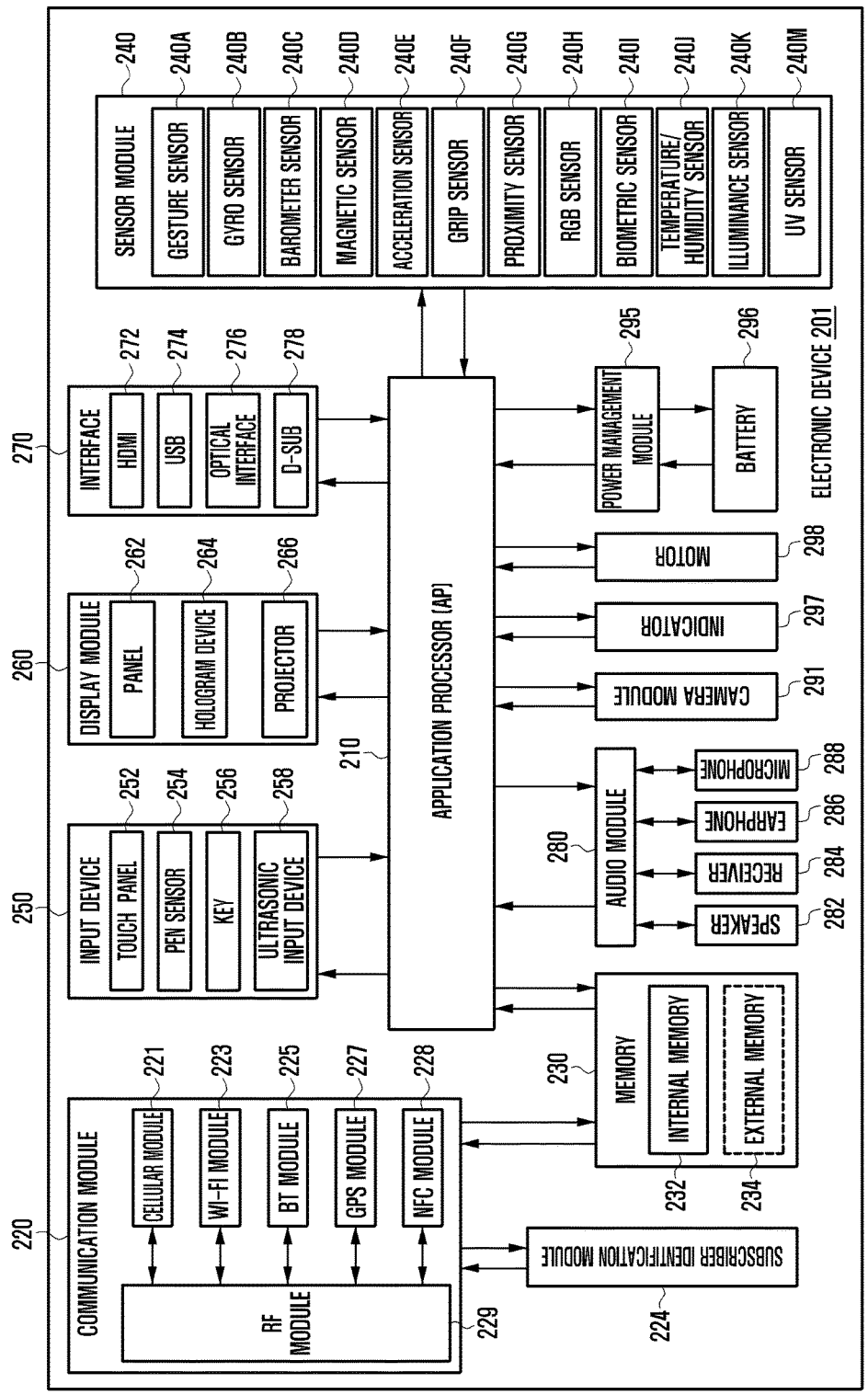
FIG. 2 is a block diagram of a configuration of an electronic device, according to an embodiment of the present disclosure.

FIG. 2 is a block diagram of a configuration of an electronic device, according to an embodiment of the present disclosure.

Referring to FIG. 2 an electronic device 201, according to an embodiment of the present disclosure, is provided. The electronic device 201 may be configured as a whole or a part of the electronic device 101 illustrated in FIG. 1. The electronic device 201 includes one or more application processors (APs) 210, a communication interface 220, a subscriber identification module (SIM) 224, a memory 230, a sensor module 240, an input device 250, a display module 260, an interface 270, an audio module 280, a camera module 291, a power managing module 295, a battery 296, an indicator 297, and a motor 298.

The AP 210 operates an operating system (OS) or an application program so as to control a plurality of hardware or software component elements connected to the AP 210 and execute various data processing and calculations including multimedia data. The AP 210 may be implemented by, for example, a System on Chip (SoC). According to an embodiment, the processor 210 may further include a Graphic Processing Unit (GPU).

The communication interface 220 transmits/receives data between the electronic device 201 and an electronic device (for example, the external electronic devices 102 and 104, and the server 106) connected to the electronic device 201 through a network. The communication interface 220 includes a cellular module 221, a WiFi module 223, a BT module 225, a GPS module 227, a NFC module 228, and a radio frequency (RF) module 229.

The cellular module 221 provides a voice, a call, a video call, a short message service (SMS), or an Internet service through a communication network (for example, LTE, LTE-A, CDMA, WCDMA, UMTS, WiBro, GSM, etc.). Further, the cellular module 221 may distinguish and authenticate electronic devices within a communication network by using the subscriber identification module 224. The cellular module 221 may perform at least some of the functions which can be provided by the AP 210. For example, the cellular module 221 may perform at least some of the multimedia control functions.

The cellular module 221 may include a communication processor (CP). Further, the cellular module 221 may be implemented by, for example, an SoC.

The AP 210 or the cellular module 221 may load a command or data received from at least one of a non-volatile memory and other components connected to each of the AP 210 and the cellular module 221 to a volatile memory and process the loaded command or data. Further, the AP 210 or the cellular module 221 may store data received from at least one of other components or generated by at least one of other components in a non-volatile memory.

Each of the WiFi module 223, the BT module 225, the GPS module 227, and the NFC module 228 may include a processor for processing data transmitted/received through the corresponding module. Although the cellular module 221, the WiFi module 223, the BT module 225, the GPS module 227, and the NFC module 228 are illustrated as blocks separate from each other in FIG. 2, at least some of the cellular module 221, the WiFi module 223, the BT module 225, the GPS module 227, and the NFC module 228 may be included in one integrated chip (IC) or one IC package according to one embodiment. For example, at least some of the processors (for example, the communication processor corresponding to the cellular module 221 and the WiFi processor corresponding to the WiFi module 223) corresponding to the cellular module 221, the WiFi module 223, the BT module 225, the GPS module 227, and the NFC module 228 may be implemented by one SoC.

The RF module 229 transmits/receives an RF signal. The RF module 229 may include a transceiver, a power amp module (PAM), a frequency filter, a low noise amplifier (LNA), etc. Further, the RF module 229 may further include a component for transmitting/receiving electronic waves over a free air space in wireless communication, for example, a conductor, a conducting wire, etc. Although the cellular module 221, the WiFi module 223, the BT module 225, the GPS module 227, and the NFC module 228 are illustrated as sharing one RF module 229 in FIG. 2, at least one of the cellular module 221, the WiFi module 223, the BT module 225, the GPS module 227, and the NFC module 228 may transmit/receive an RF signal through a separate RF module according to one embodiment.

The SIM 224 may be a card, including a Subscriber Identification Module, which may be inserted into a slot formed in a particular portion of the electronic device 201 or may be an embedded SIM. The SIM 224 includes unique identification information (for example, integrated circuit card identifier (ICCID)) or subscriber information (for example, international mobile subscriber identity (IMSI)).

The memory 230 may include an internal memory 232 or an external memory 234. The internal memory 232 may include at least one of a volatile memory (for example, a random access memory (RAM), a dynamic RAM (DRAM), a static RAM (SRAM), a synchronous dynamic RAM (SDRAM), etc.), and a non-volatile memory (for example, a read only memory (ROM), a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, etc.).

The internal memory 232 may be a solid state drive (SSD).

The external memory 234 may include a flash drive, for example, a compact flash (CF), a secure digital (SD), a micro secure digital (Micro-SD), a mini secure digital (Mini-SD), an extreme digital (xD), or a memory stick. The external memory 234 may be functionally connected to the electronic device 201 through various interfaces. The electronic device 201 may further include a storage device (or storage medium) such as a hard drive.

The sensor module 240 measures a physical quantity or detects an operation state of the electronic device 201, and converts the measured or detected information to an electronic signal. The sensor module 240 may include at least one of a gesture sensor 240A, a gyro sensor 240B, a barometric sensor 240C, a magnetic sensor 240D, an acceleration sensor 240E, a grip sensor 240F, a proximity sensor 240G, a red, green, and blue (RGB) sensor 240H, a biometric sensor 240I, a temperature/humidity sensor 240J, an illuminance sensor 240K, and a ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an InfraRed (IR) sensor, an iris sensor, or a fingerprint sensor, etc. The sensor module 240 may further include a control circuit for controlling one or more sensors included in the sensor module 240.

The input device 250 includes a touch panel 252, a (digital) pen sensor 254, a key 256, and an ultrasonic input device 258.

The touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 provides a tactile reaction to the user.

The (digital) pen sensor 254 may be implemented using a method identical or similar to a method of receiving a touch input of the user, or using a separate recognition sheet.

The key 256 may include a physical button, an optical key, or a key pad.

The ultrasonic input device 258 is a device which can detect an ultrasonic wave, by a microphone 288 of the electronic device 201, generated by an input means, and identify data corresponding to the ultrasonic wave.

The electronic device 201 receives a user input from an external device connected to the electronic device 201 by using the communication interface 220.

The display 260 includes a panel 262, a hologram device 264, and a projector 266.

The panel 262 may be, for example, a liquid crystal display (LCD) or an active matrix organic light emitting diode (AM-OLED). The panel 262 may be implemented to be, for example, flexible, transparent, or wearable. The panel 262 may be configured by the touch panel 252 and one module.

The hologram device 264 displays a stereoscopic image in the air by using an interference of light.

The projector 266 projects light on a screen to display an image. For example, the screen may be located inside or outside the electronic device 201. The display 260 may further include a control circuit for controlling the panel 262, the hologram device 264, and the projector 266.

The interface 270 includes a high-definition multimedia interface (HDMI) 272, a universal serial bus (USB) 274, an optical interface 276, and a D-subminiature (D-sub) 278. The interface 270 may be included in the communication interface 170 illustrated in FIG. 1. Additionally or alternatively, the interface 290 may include, for example, a mobile high-definition link (MHL) interface, an SD card/multimedia card (MMC), or an infrared data association (IrDA) standard interface.

The audio module 280 bi-directionally converts a sound and an electronic signal. At least some components of the audio module 280 may be included in the input/output interface 150 illustrated in FIG. 1. The audio module 280 processes sound information input or output through a speaker 282, a receiver 284, an earphone 286, or the microphone 288.

The camera module 291 is a device which can photograph a still image and a video. The camera module 291 may include one or more image sensors (for example, a front sensor or a back sensor), an image signal processor (ISP) or a flash (for example, an LED or xenon lamp).

The power managing module 295 manages power of the electronic device 201. The power managing module 295 may include a power management integrated circuit (PMIC), a charger integrated circuit (IC), or a battery gauge.

The PMIC may be mounted to, for example, an integrated circuit or an SoC semiconductor. A charging method may be divided into wired and wireless methods. The charger IC charges a battery and prevents over voltage or over current from flowing from a charger. The charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added.

The battery gauge measures, for example, a remaining quantity, a voltage, a current, or a temperature during charging of the battery 296. The battery 296 may store or generate electricity and supply power to the electronic device 201 by using the stored or generated electricity. The battery 296 may include a rechargeable battery or a solar battery.

The indicator 297 shows particular statuses of the electronic device 201 or a part (for example, AP 210) of the electronic device 201, for example, a booting status, a message status, a charging status etc. The motor 298 converts an electrical signal to a mechanical vibration.

The electronic device 201 may include a processing unit (for example, GPU) for supporting a module TV. The processing unit for supporting the mobile TV may process media data according to a standard of digital multimedia broadcasting (DMB), digital video broadcasting (DVB), media flow, etc.

Each of the components of the electronic device 201, according to various embodiments of the present disclosure, may be implemented by one or more components and the name of the corresponding component may vary depending on a type of the electronic device. The electronic device 201 may include at least one of the above described components, a few of the components may be omitted, or additional components may be further included. Also, some of the components of the electronic device 201 may be combined to form a single entity, and thus may perform functions equivalent to those of the corresponding components before being combined.

Figure 3:
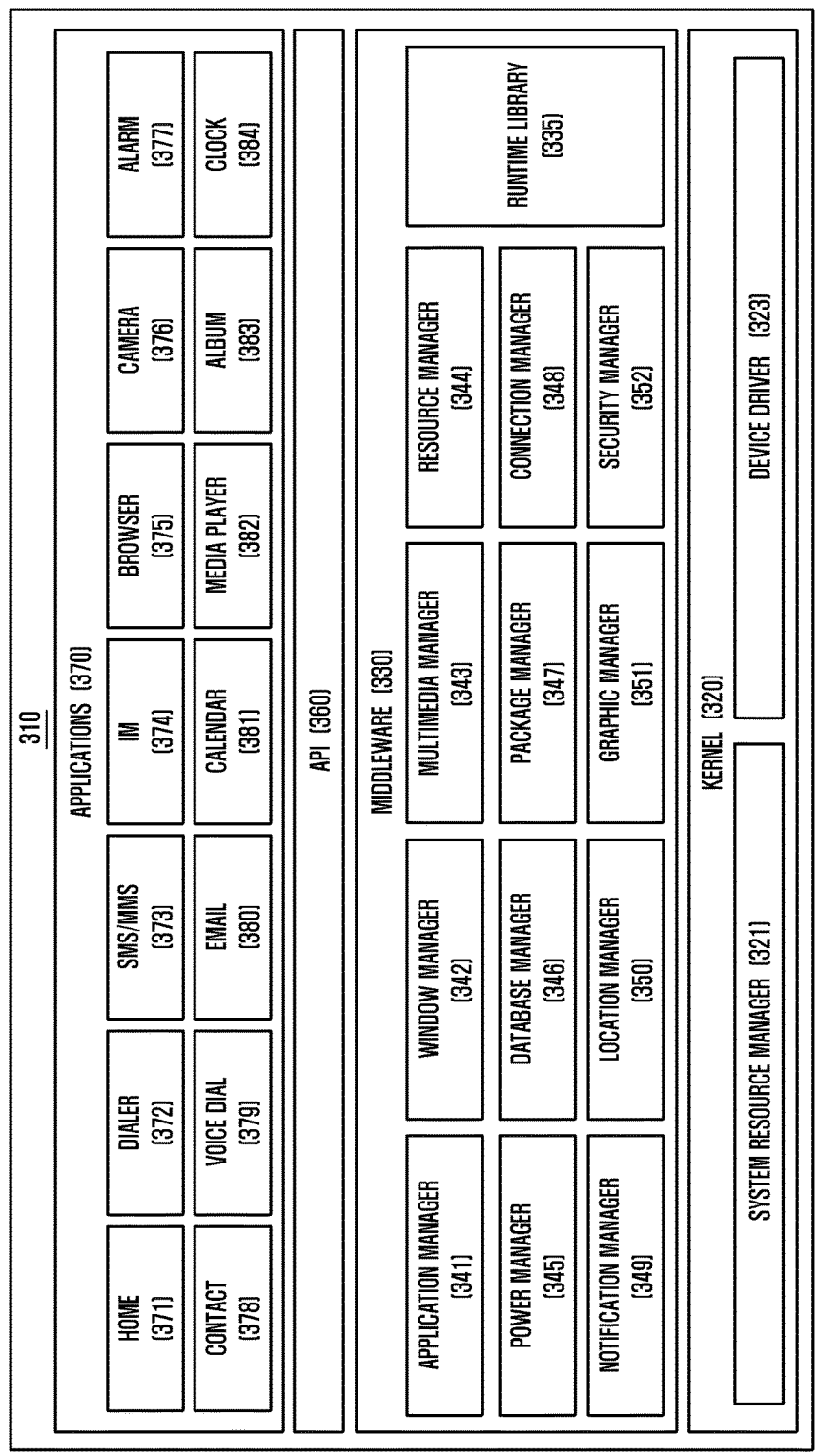
FIG. 3 is a block diagram of a program module, according to an embodiment of the present disclosure.

FIG. 3 is a block diagram of a program module, according to an embodiment of the present disclosure.

Referring to FIG. 3 a programming module 310, according to an embodiment of the present application, is provided. The programming module 310 may be stored in the memory 130 of the electronic device 101 illustrated in FIG. 1. At least some of the programming module 310 may be formed of software, firmware, hardware, or a combination of software, firmware, and hardware. The programming module 310 may include an operating system (OS) for controlling resources related to the electronic device 100 or applications 370 executed in the OS. For example, the OS may be Android™ iOS™, Windows™, Symbian™, Tizen™, Bada™, etc. The programming module 310 includes a kernel 320, a middleware 330, an Application Programming Interface (API) 360, and the applications 370.

The kernel 320 includes a system resource manager 321 and a device driver 323.

The system resource manager 321 may include a process manager, a memory manager, and a file system manager. The system resource manager 321 performs a system resource control, allocation, and recall.

The device driver 323 may include a display driver, a camera driver, a Bluetooth driver, a shared memory driver, a USB driver, a keypad driver, a WiFi driver, and an audio driver. The device driver 323 may further include an inter-process communication (IPC) driver.

The middleware 330 includes a plurality of modules prepared in advance to provide a function required in common by the applications 370. Further, the middleware 330 provides a function through the API 360 to allow the applications 370 to efficiently use limited system resources within the electronic device. For example, the middleware 300 may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 includes a library module used by a compiler to add a new function through a programming language while one of the applications 370 is executed. The runtime library 335 performs input and output management, memory management, a function associated with an arithmetic function, etc.

The application manager 341 manages a life cycle of at least one of the applications 370.

The window manager 342 manages GUI resources used on a screen of the electronic device 201.

The multimedia manager 343 detects a format required for reproducing various media files and performs an encoding or a decoding of a media file by using a codec suitable for the corresponding format.

The resource manager 344 manages resources such as a source code, a memory, or a storage space of at least one of the applications 370.

The power manager 345 operates together with a basic input/output system (BIOS) to manage a battery or power and provides power information required for the operation.

The database manager 346 manages generation, search, and change of a database to be used by at least one of the applications 370.

The package manager 347 manages an installation or an update of an application distributed in a form of a package file.

The connection manager 348 manages a wireless connection such as WiFi or Bluetooth.

The notification manager 349 displays or notifies a user of an event such as an arrival message, an appointment, a proximity alarm, etc., in a manner that does not disturb the user.

The location manager 350 manages location information of the electronic device 201.

The graphic manager 351 manages a graphic effect provided to the user or a user interface related to the graphic effect.

The security manager 352 provides a general security function required for a system security or a user authentication.

When the electronic device 201 has a call function, the middleware 330 may further include a telephony manager for managing a voice call or video call function of the electronic device 201.

The middleware 330 may generate a new middleware module through a combination of various functions of the aforementioned internal component modules and use the generated new middleware module. The middleware 330 may provide a module specified for each type of OS to provide a differentiated function. Further, the middleware 330 may dynamically delete some of the conventional components or add new components. Accordingly, some of the components described in the present disclosure may be omitted, replaced with other components having different names but performing similar functions, or other components may be further included.

The API 360 is a set of API programming functions, and may be provided with a different configuration according to an OS. For example, in Android™ or iOS™, a single API set may be provided for each platform. In Tizen™, two or more API sets may be provided.

The applications 370 may include a preloaded application and/or a third party application. The applications 370 may include a home application 371, a dialer application 372, a SMS/MMS application 373, an instant messaging (IM) application 374, a browser application 375, a camera application 376, an alarm application 377, a contact application 378, a voice dial application 379, an email application 380, a calendar application 381, a media player application 382, an album application 383, and a clock application 384. However, the present disclosure is not limited thereto, and the applications 370 may include any other similar and/or suitable application.

At least a part of the programming module 310 can be implemented by instructions stored in a computer-readable storage media. When the instructions are executed by the AP 210, the AP 210 can perform functions corresponding to the instructions. The computer-readable storage media may be the memory 230. At least a part of the programming module 310 can be implemented by the AP 210. At least a part of the programming module 310 may include a module, a program, a routine, a set of instructions and/or a process for performing at least one function.

The term "module", as used herein may refer to a unit including one of hardware, software, and firmware or a combination of two or more of them. The term "module" may be used interchangeably with the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which have been known or are to be developed hereinafter.

The computer-readable recoding media may include a hard disk, a floppy disk, magnetic media (e.g., a magnetic tape), optical media (e.g., a compact disc ROM (CD-ROM) and a DVD), magneto-optical media (e.g., a floptical disk), a hardware device (e.g., a ROM, a random access memory (RAM), a flash memory), etc. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The names of the aforementioned elements of the programming module 310 may vary depending on the type of OS. The programming module 310 may include at least one of the aforementioned elements and/or may further include other additional elements, and/or some of the aforementioned elements may be omitted. The operations performed by a programming module 310 and/or other elements may be processed through a sequential, parallel, repetitive, and/or heuristic method, and some of the operations may be omitted and/or other operations may be added.

Figure 4:
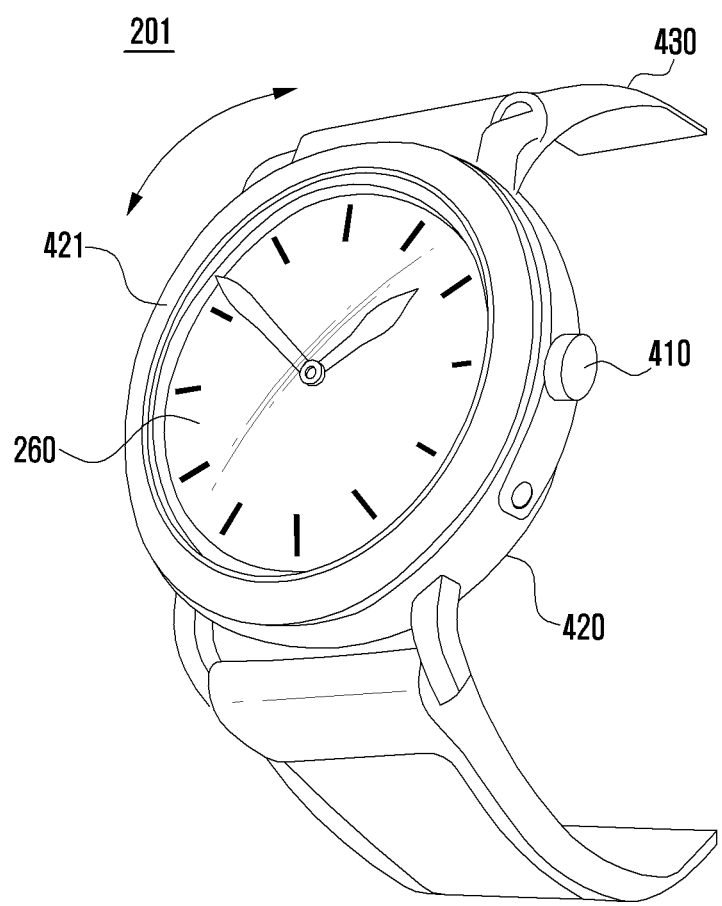
FIG. 4 illustrates of an electronic device, according to an embodiment of the present disclosure.

FIG. 4 illustrates of an electronic device, according to an embodiment of the present disclosure.

Referring to FIG. 4, an electronic device 201, according to an embodiment of the present disclosure, is shown.

The electronic device 201 may be a wearable device, such as a smart watch. The electronic device 201 may include a crown 410, a case 420, and a band 430.

The crown 410 may be disposed in at least a portion of the case 420 to protrude therefrom. The crown 410, for example, may have a polygonal columnar shape or a cylindrical shape. The section of the crown 410 in a polygonal columnar shape, which is obtained by cutting the crown 410 in the direction perpendicular to the rotational axis thereof may be a triangle or a rectangle. The section of the crown 410 in a cylindrical shape, which is obtained by cutting the crown 410 in the direction perpendicular to the rotational axis thereof, may be a circle. The section of the crown 410 in a columnar shape, which is obtained by cutting the crown 410 in the direction perpendicular to the rotational axis thereof, may have, at least in part, a shape of a circle or a serrated wheel. The crown 410 in a columnar shape may have a camera window that is disposed in at least a side portion of the column.

The crown 410 may be coupled to the case 420 to be rotatable about the rotational axis. The crown 410 may be coupled to the case 420 by means of a stem to be rotatable, which provides the rotational axis. The crown 410 may have components for operating a camera function, which are mounted in the inner space of the column. The crown 410 may be coupled to the case 420 to be rotatable without the stem in order to mount components for operating a camera function in the inner space of the column. In order for the crown 410 to be coupled to the case 420 to be rotatable without a separate stem, the case 420 and the crown 410 may be fitted to each other. A water-proof structure, such as a rubber ring or a sealant, may be further provided between the crown 410 and the case 420 to prevent water from penetrating through a gap between the crown 410 and the case 420.

The crown 410 may play the same role as the input/output interface 150 of FIG. 1 or as the input device 250 of FIG. 2. When the crown 410 is rotated, the electronic device 201 may determine, as a user input, the rotational speed and rotational direction of the crown 410 to control the functions of the electronic device 201 according to the user input.

For example, if the user input corresponds to the rotational direction of the crown 410, the electronic device 201 may enlarge, reduce, or rotate an image that is displayed on the display 260, or may change the scrolling direction of a list that is displayed on the display 260 according to the user input. If the user input corresponds to the rotational speed of the crown 410, the electronic device 201 may change the speed of enlargement/reduction of an image that is displayed on the display 260, the rotational speed of the image, or the scrolling speed of a list, which is displayed on the display 260, according to the user input.

When the crown 410 rotates in the first direction (e.g., in the clockwise direction), the electronic device 201 may determine, as a user input, the first rotational direction of the crown 410 in order to enlarge the image that is displayed on the display 260. When the crown 410 rotates in the second direction (e.g., in the counter-clockwise direction), the electronic device 201 may determine, as a user input, the second rotational direction of the crown 410 in order to reduce the image that is displayed on the display 260.

The crown 410 may include at least one of a camera window, a reflector, or a lens barrel. Light (or a photon) passing through the camera window may reach an image sensor inside the case 420. When the crown 410 is rotated, the camera window, which is disposed in the crown 410, is moved as well. The movement of the camera window may secure a wide range of photographing angles. The light passing through the camera window may reach the image sensor after passing through the reflector and the lens barrel.

The case 420 may include a bezel 421 and a display 260 in the outer portion. The case 420 may include, in the inner or outer portion, the AP 210, the communication module 220, the memory 230, the sensor module 240, the input device 250, the display 260, the interface 270, the audio module 280, the camera module 291, the indicator 297, the motor 298, the power management module 295, the battery 296, and the subscriber identification module 224 of FIG. 2.

The case 420 may include one or more image sensors of the camera module 291 inside the case 420. When the one or more image sensors detect light, the image sensors may convert the same into electrical signals to then be transmitted to an ISP of the camera module 291 or to the AP 210. The ISP of the camera module 291 or the AP 210 may process the electrical signals received from the image sensor to create images. The created images may be displayed on the display 260 under the control of the AP 120.

The bezel 421 may have an annular shape that is concentric with the display 260 in a circular shape. The inner radius of the bezel 421 may be identical to the radius of the display 260. The bezel 421 may be disposed in the edge area of the case 420 to protect the display 260 from an external impact.

The bezel 421 may be rotated in the clockwise, or counter-clockwise direction. The bezel 421 may play the role of the input/output interface 150 of FIG. 1 or the input device 250 of FIG. 2. When the bezel 421 is rotated, the electronic device 201 may determine, as a user input, the rotational speed and rotational direction of the bezel 421, and may control the functions of the electronic device 201 according to the user input.

For example, if the user input corresponds to the rotational direction of the bezel 421, the electronic device 201 may enlarge, reduce, or rotate an image that is displayed on the display 260, or may change the scrolling direction of a list that is displayed on the display 260 according to the user input. If the user input corresponds to the rotational speed of the bezel 421, the electronic device 201 may change the speed of enlargement/reduction of an image that is displayed on the display 260, the rotational speed of the image, or the scrolling speed of a list, which is displayed on the display 260 according to the user input.

When the bezel 421 is rotated in the first direction (e.g., in the clockwise direction), the electronic device 201 may determine, as a user input, the rotation of the bezel 421 in the first direction in order to rotate the image, which is displayed on the display 260, in the first direction. When the bezel 421 is rotated in the second direction (e.g., in the counter-clockwise direction), the electronic device 201 may determine, as a user input, the rotation of the bezel 421 in the second direction in order to rotate the image, which is displayed on the display 260, in the second direction.

The band 430 may allow the electronic device 201 to be worn on the user's wrist. The band 430 may be made of a variety of materials, such as metal, rubber, or leather. The band 430 is connected to one end of the case 420, and the band 430 connected to the case 420 may be detachable.

Figure 5:
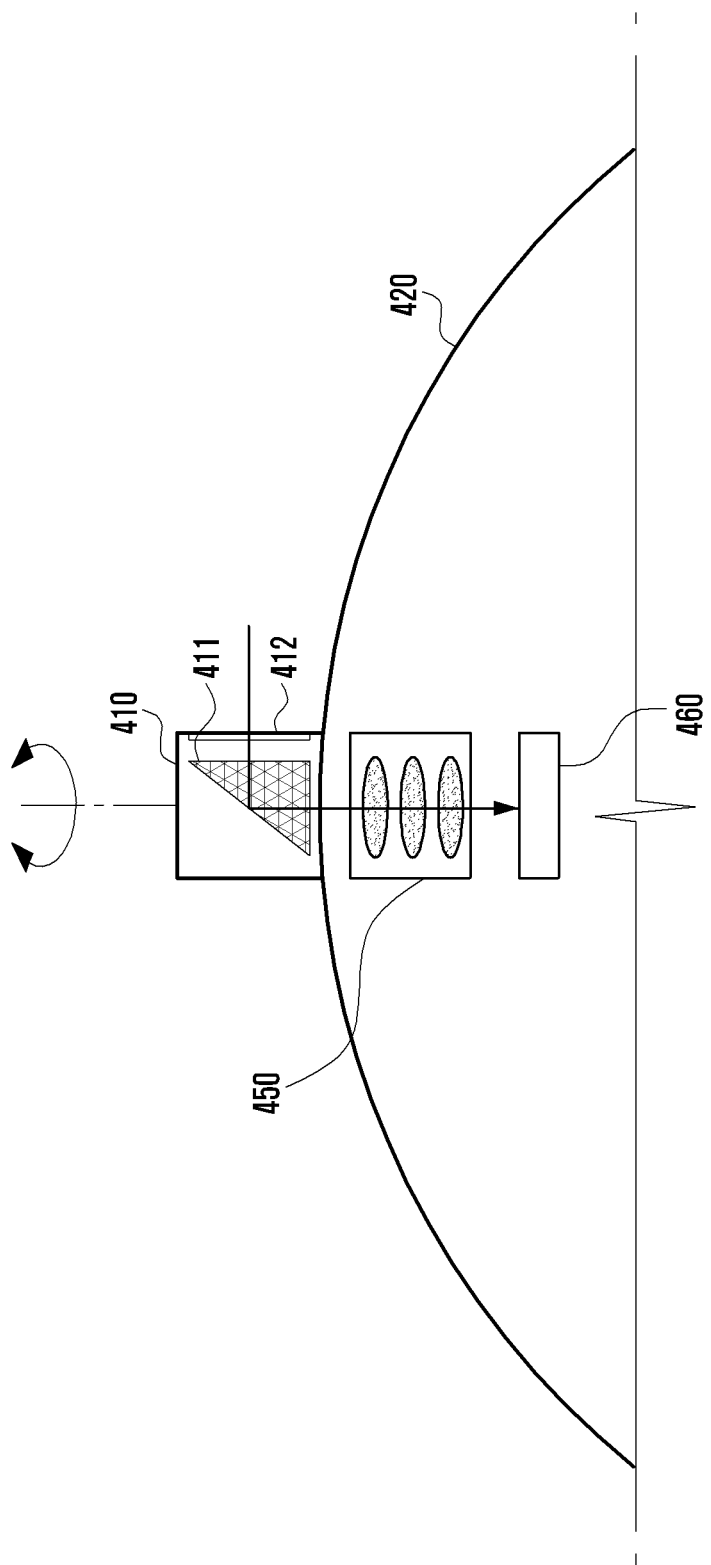
FIG. 5 illustrates a view of a camera arranged in an electronic device, according to an embodiment of the present disclosure.

FIG. 5 illustrates a view of a camera arranged in an electronic device, according to an embodiment of the present disclosure.

Referring to FIG. 5, the crown 410 and the case 420 of the electronic device 201, according to an embodiment of the present disclosure, is shown. The crown 410 may include a reflector 411 and a camera window 412. The case 420 may include a lens barrel 450 and an image sensor 460.

The reflector 411 may be configured with a prism or a mirror. The reflector 411 allows light that passes through the camera window 412 to be reflected at a right angle and to then reach the lens barrel 450 and the image sensor 460. In order to allow light passing through the camera window 412 to be reflected at a right angle and to then reach the lens barrel 450 and the image sensor 460, the reflector 411 may be a prism or a mirror that is tilted at an angle of 45 degrees with respect to the camera window 412 or with respect to the lens barrel 450.

The lens barrel 450 may include one or more lenses, and may focus a light that passes through the reflector 411 on the image sensor 460 by using one or more lenses in order to photograph an object.

When light is detected, the image sensor 460 may convert the light into an electrical signal to be transmitted to the ISP of the camera module 291 or to the AP 210. The ISP of the camera module 291 or the AP 210 may process the electrical signal received from the image sensor to create images. The created images may be displayed on the display 260 under the control of the AP 210.

When the crown 410 is rotated, the camera window 412 is rotated along with the crown 410 in order to transfer a light to the image sensor 460 at various angles so that the electronic device 201 may secure a variety of photographing angles.

Figure 6:
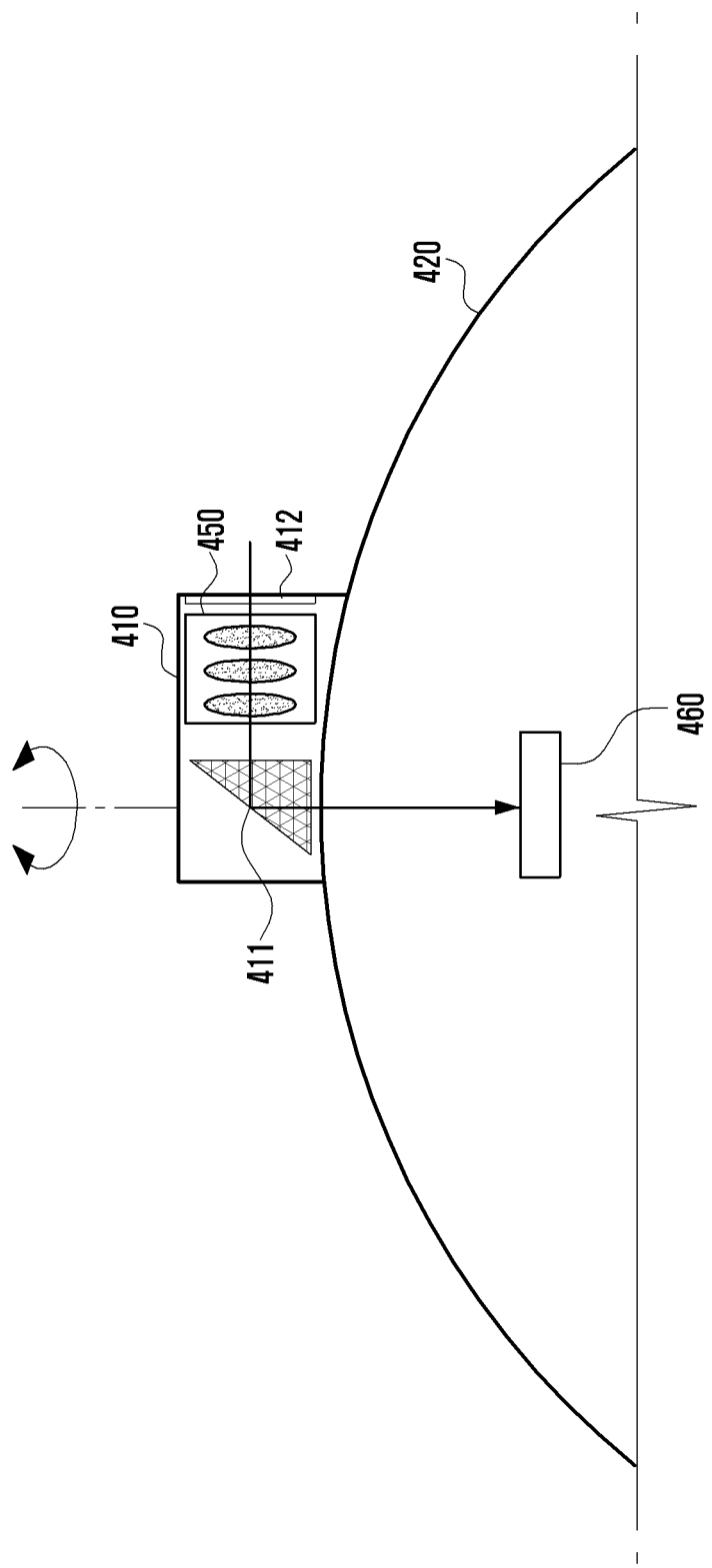
FIG. 6 illustrates a view of a camera arranged in an electronic device, according to an embodiment of the present disclosure.

FIG. 6 illustrates a view of a camera arranged in an electronic device, according to an embodiment of the present disclosure.

Referring to FIG. 6, the crown 410 and the case 420 of the electronic device 201, according to an embodiment of the present disclosure, is shown. The crown 410 may include a reflector 411, a camera window 412, and a lens barrel 450. The case 420 may include the image sensor 460.

When the crown 410 is rotated, the widow camera 412 is rotated along with the crown 410, and when the camera function of the electronic device 201 is activated, the camera window 412 may allow light to pass through to reach the inside of the electronic device 201.

The lens barrel 450 may include one or more lenses, and may focus light that has passed through the camera window 412 to then be transmitted to the reflector 411 by using one or more lenses.

The reflector 411 may be configured with a prism or a mirror. The reflector 411 may allow light that passes through the lens barrel 450 to be reflected at a right angle and to then reach the image sensor 460. In order to allow light passing through the camera window 412 to be reflected at a right angle and to then reach the image sensor 460, the reflector 411 may be a prism or a mirror that is tilted at an angle of 45 degrees with respect to the lens barrel 450 or with respect to the image sensor 460.

When light is detected, the image sensor 460 may convert the light into an electrical signal to be transmitted to the ISP of the camera module 291 or to the AP 210. The ISP of the camera module 291 or the AP 210 may process the electrical signal received from the image sensor to create images. The created images may be displayed on the display 260 under the control of the AP 210.

When the crown 410 is rotated, the camera window 412 is rotated along with the crown 410 in order to transfer the light to the image sensor 460 at various angles so that the electronic device 201 may secure a variety of photographing angles.

Figure 7:
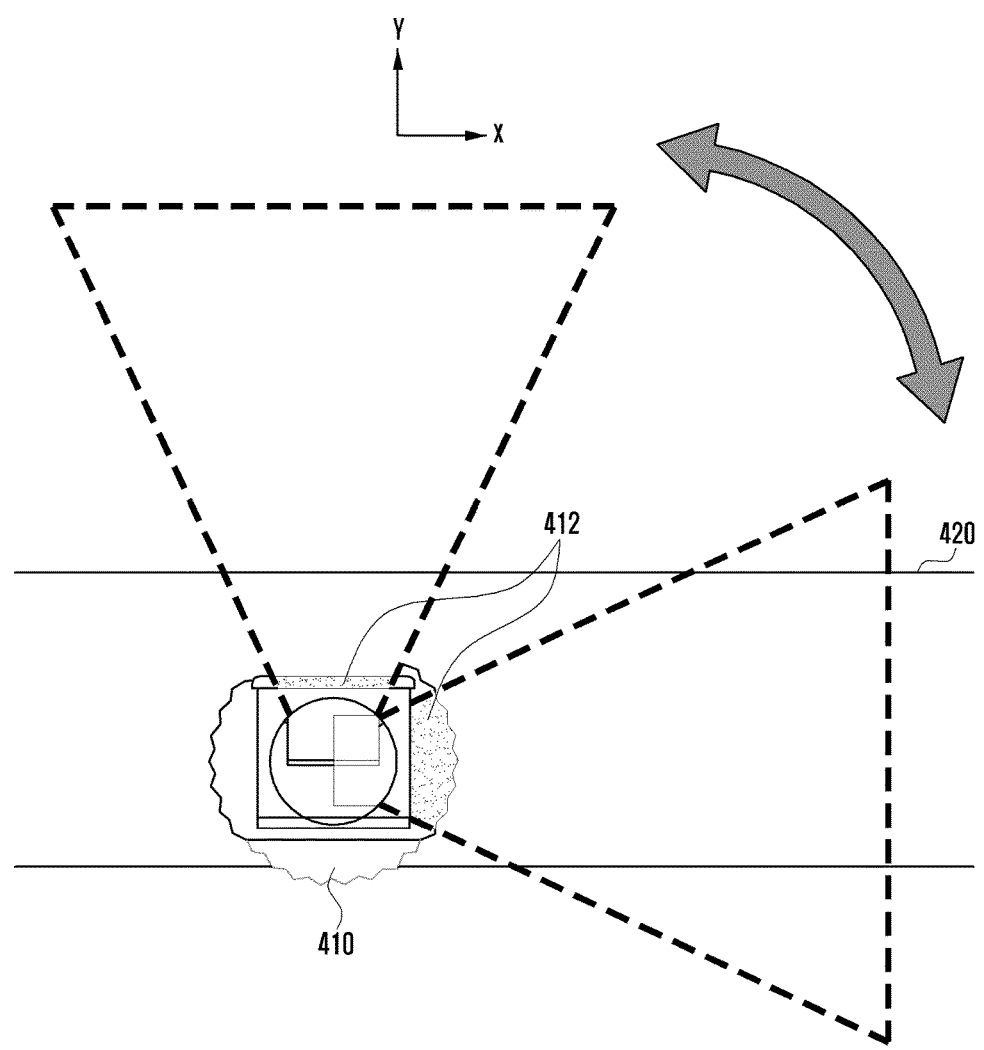
FIG. 7 illustrates a view of a photographing angle of a camera arranged in an electronic device, according to an embodiment of the present disclosure.

FIG. 7 illustrates a view of a photographing angle of a camera arranged in an electronic device, according to an embodiment of the present disclosure.

Referring to FIG. 7, the crown 410 of the electronic device 201, according to an embodiment of the present disclosure, is shown. If the crown 410 that is provided in the side portion of the case 420 is rotated in order to obtain images at various photographing angles when taking photos, the camera window 412 that is provided in the crown 410 is rotated along with the crown 410 in order to secure various photographing angles according to the rotational direction of the camera window 412.

For example, in the case of performing a selfie function, the user may rotate the crown 410 of the electronic device 201 that is worn on the user's wrist such that the camera window 412 is directed to the user's face, and may then take a photo.

The electronic device 201 may provide an image that is being taken by using a preview image. The user may identify the image to be taken by the preview image through the display 260, and may rotate the crown 410 to then adjust the image to a desired angle.

Figure 8:
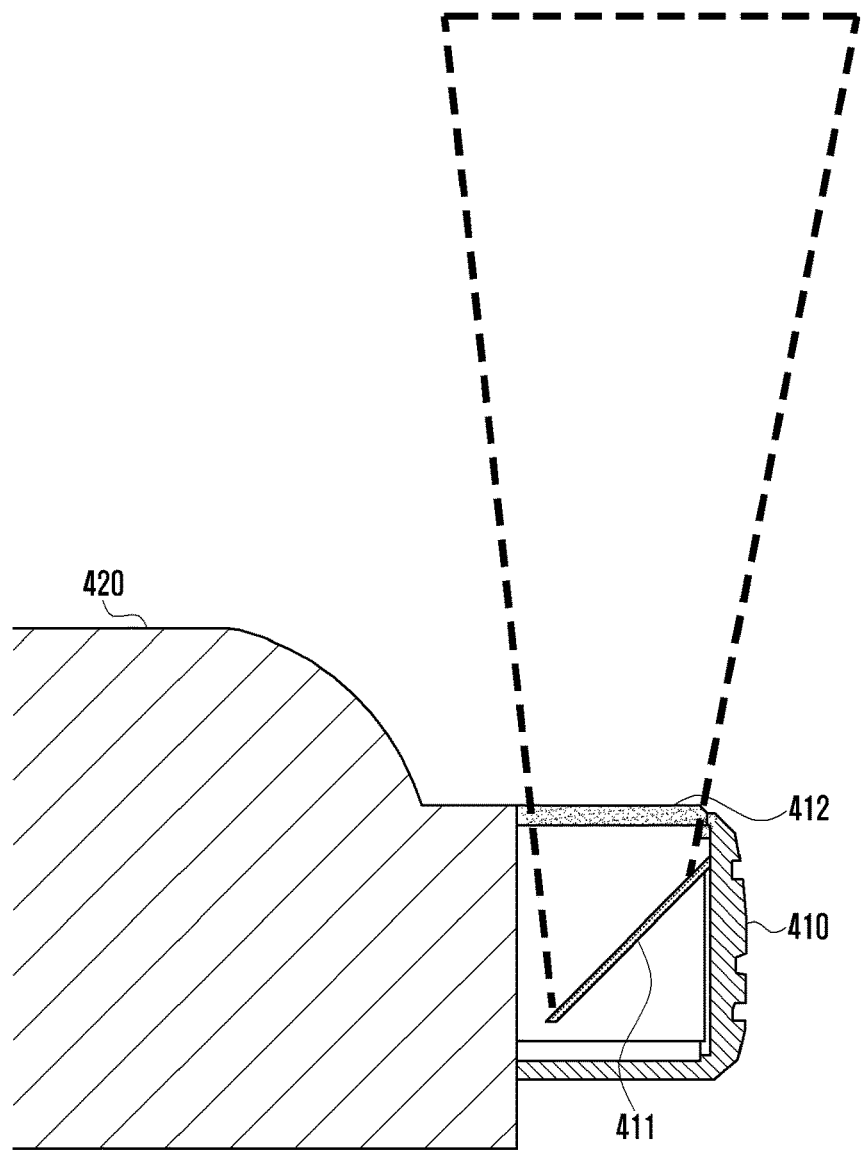
FIG. 8 illustrates a view of a camera arranged in an electronic device, according to an embodiment of the present disclosure.

FIG. 8 illustrates a view of a camera arranged in an electronic device, according to an embodiment of the present disclosure.

Referring to FIG. 8, the crown 410 and case 420 of the electronic device 201, according to an embodiment of the present disclosure, is shown. The crown 410 may include the reflector 411 and the camera window 412. The reflector 411 may be configured with a prism or a mirror. The reflector 411 may allow light that passes through the camera window 412 to be reflected at a right angle and to then reach the lens barrel 450 and the image sensor 460. In order to allow the light passing through the camera window 412 to be reflected at a right angle and to then reach the lens barrel 450 and the image sensor 460, the reflector 411 may be a prism or a mirror that is tilted at an angle of 45 degrees with respect to the camera window 412 or with respect to the lens barrel 450.

Figure 9:
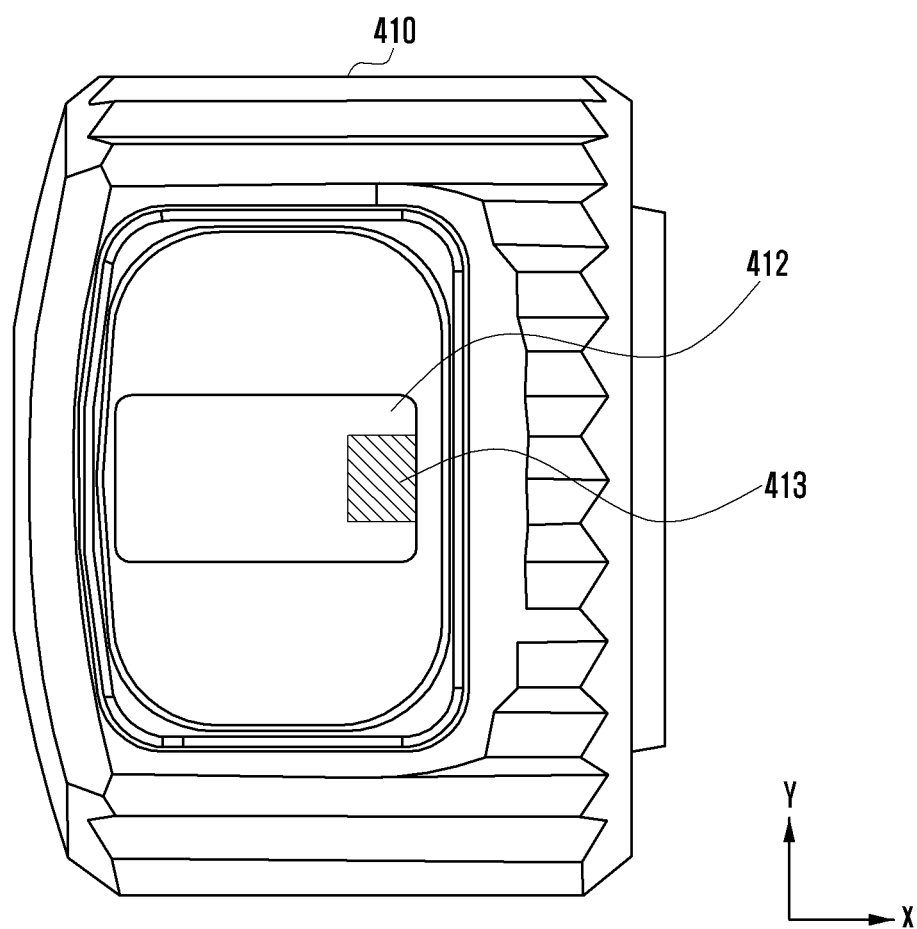
FIG. 9 illustrates a view of a camera arranged in an electronic device, according to an embodiment of the present disclosure.
Figure 10:
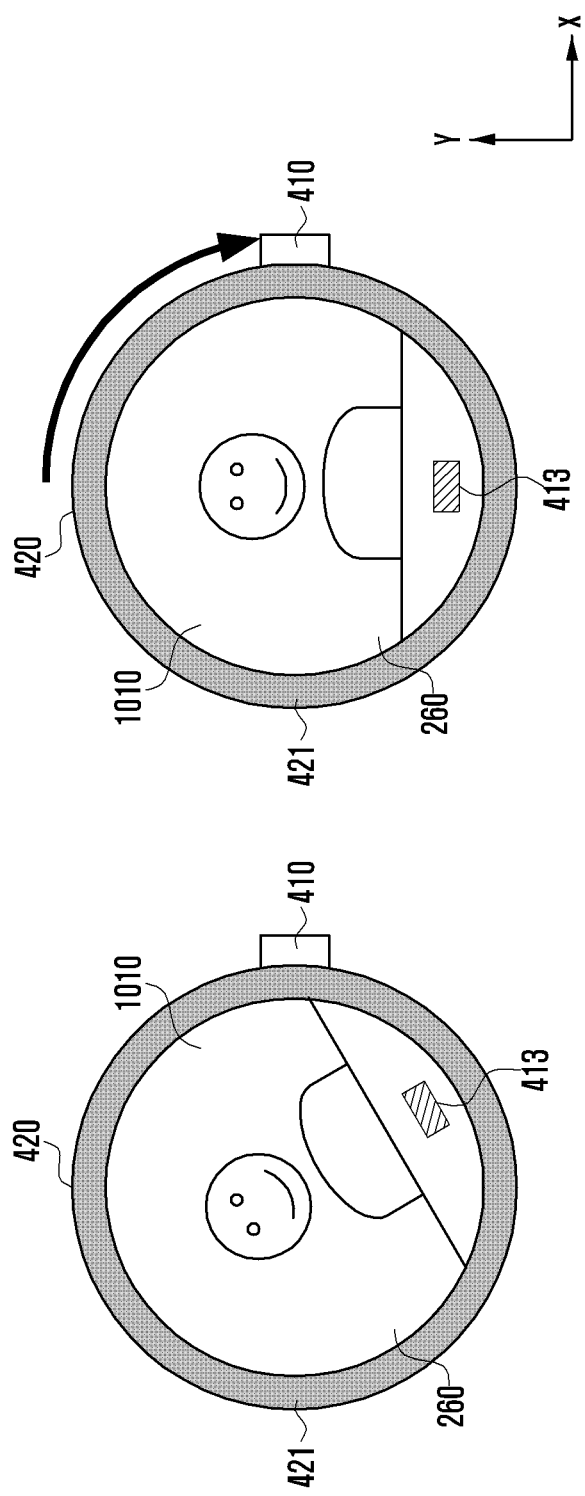
FIG. 10 automatic image correction in a display of an electronic device, according to an embodiment of the present disclosure.

FIG. 9 illustrates a view of a camera arranged in an electronic device, according to an embodiment of the present disclosure. FIG. 10 illustrates a method of automatic image correction in a display of an electronic device, according to an embodiment of the present disclosure.

Referring to FIGS. 9 and 10, the electronic device 201, according to an embodiment of the present disclosure, is shown. The electronic device 201 may mark an indicator 413 for the automatic image correction in at least a portion of the camera window 412. The indicator 413 may be a figure that includes at least one of points, lines, or planes. The indicator 413 may include colors. The indicator 413 may be photographed by the image sensor 460 when taking a photo, and the direction of the image may be corrected based on the indicator 413. If the electronic device 201 directs the indicator 413 to a certain direction while processing the image, the entire image containing the indicator 413 is also directed to the same direction so that the image may be corrected. For example, when the electronic device 201 always maintains the indicator 413 to be positioned at the bottom of the display 260 while processing the image, the entire image containing the indicator 413 may be rotated in the direction to the bottom of the display 260.

When the user photographs an image that requires the image rotation correction, the electronic device 201 may display, on the display 260, the image in the photographed direction, and may then display, on the display 260, a process of automatically correcting the image, as shown in FIG. 10. When the user photographs an image that requires the image rotation correction, the electronic device 201 may automatically determine the direction of the image in order to thereby display, on the display 260, the image of which the direction has been corrected. When the preview image is displayed, the electronic device 201 may automatically determine the direction of the image in order to display, on the display 260, the image whose direction has been corrected.

Since the indicator 413 is an image that is not desired by the user, the ISP or the AP 210 may remove the indicator 413 in the image processing in order to display, on the display 260, only an image that is desired by the user. The indicator 413 may be displayed on the preview image, and may be removed in the post image processing.

As shown in FIG. 10, when an image 1010 is obtained by rotating the crown 410, the image 1010 may be displayed on the display 260 such that the image 1010 is tilted with respect to the X-Y coordinates. The electronic device 201 may correct the direction of the image 1010 based on the indicator 413 that is photographed together with the image 1010 when taking a photo.

Figure 11:
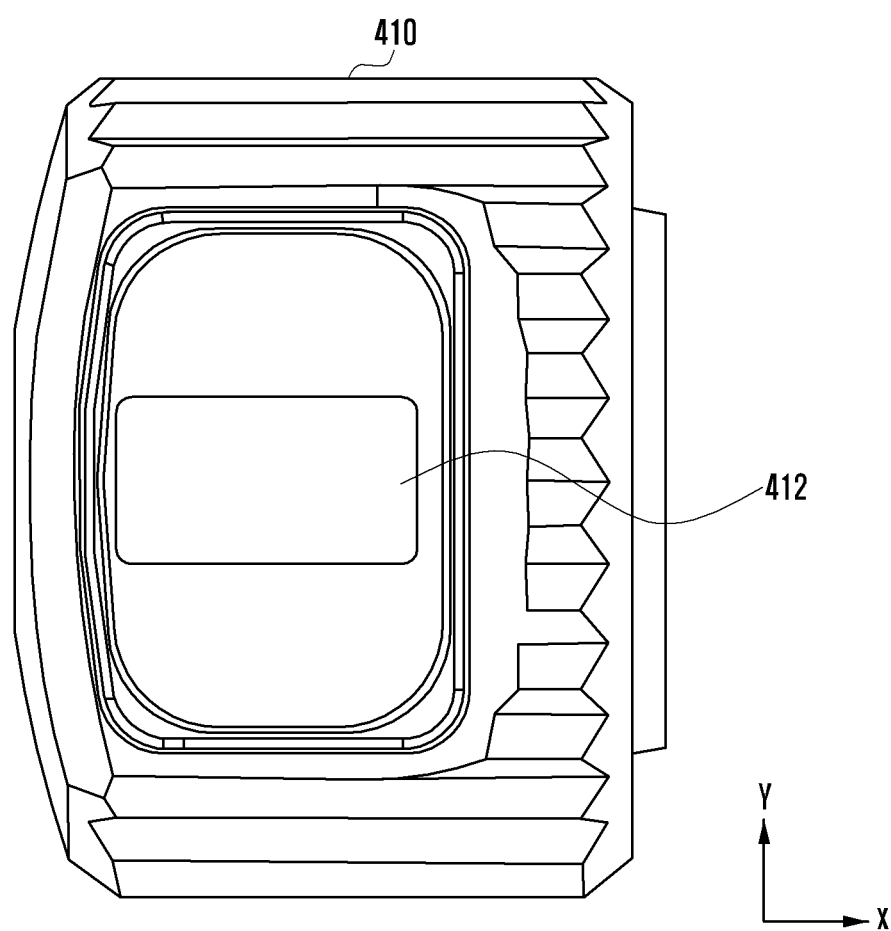
FIG. 11 illustrates a view of a camera arranged in an electronic device, according to an embodiment of the present disclosure.
Figure 12:
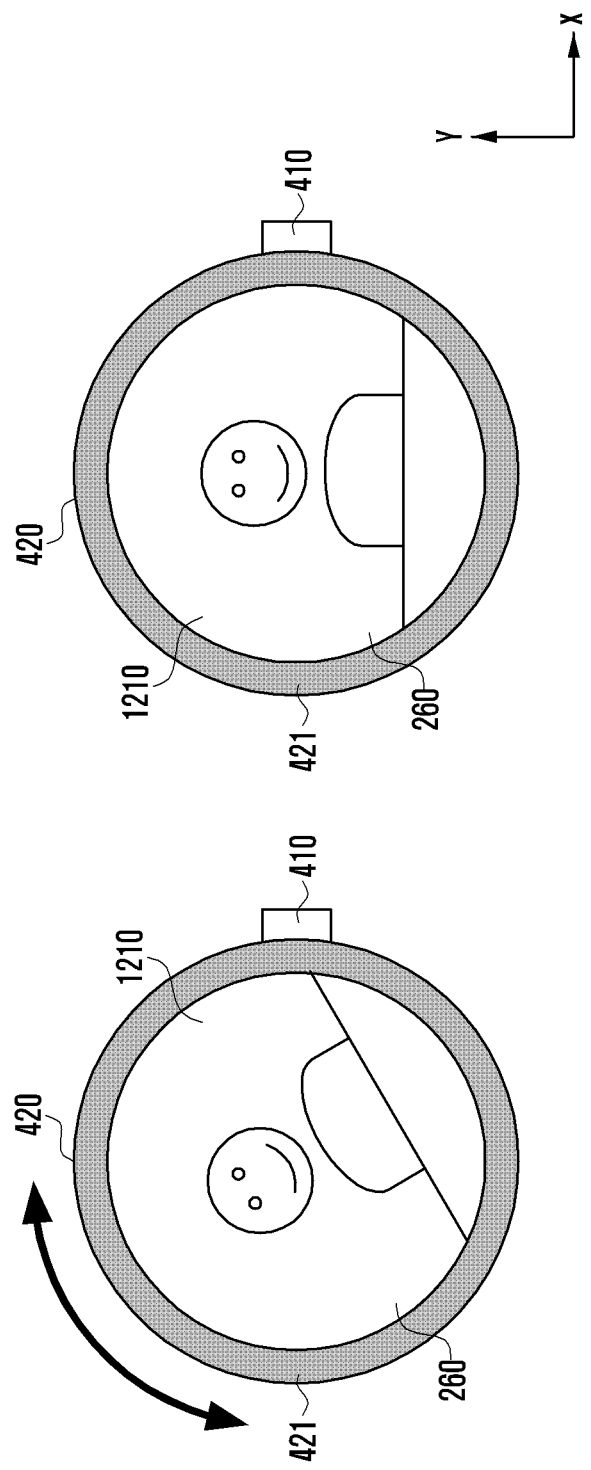
FIG. 12 illustrates a method of manual image correction in a display of an electronic device, according to an embodiment of the present disclosure.

FIG. 11 illustrates a view of a camera arranged in an electronic device, according to an embodiment of the present disclosure. FIG. 12 illustrates a method of manual image correction in a display of an electronic device, according to an embodiment of the present disclosure.

Referring to FIGS. 11 and 12, the electronic device 201, according to an embodiment of the present disclosure, is shown. The camera window 412 may not include the indicator 413. In this case, when an image 1210 is obtained by rotating the crown 410, as shown in FIG. 12, the image may be displayed on the display 260 to be tilted with respect to the X-Y coordinates. When the bezel 421 for performing an input/output interface function is rotated, the electronic device 201 may determine the rotation of the bezel 421 as a user input.

The electronic device 201 may rotate the image 1210 on the display 260 in the same direction as the rotational direction of the bezel 421 in order to correct the direction of the image 1210. The electronic device 201 may determine the rotation of the bezel 421 as a user input in order to correct the direction of the image 1210 according to the user input. In the case of correcting the direction of the image 1210 according to the user input, a guide for the correction direction may be displayed. The guide may be displayed by means of a graphic user interface, such as a cross hair or an azimuth.

Figure 13:
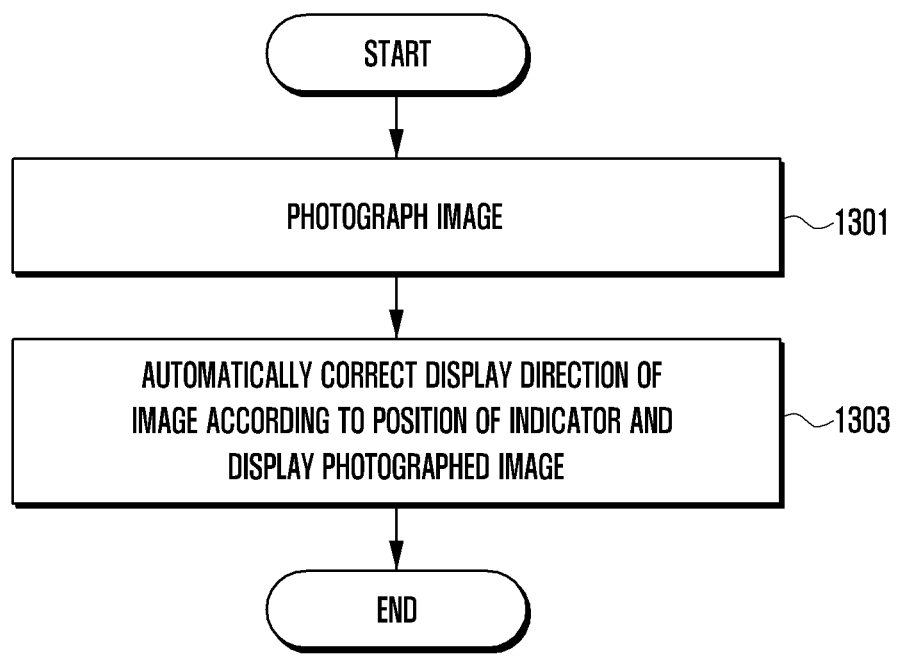
FIG. 13 is a flowchart of a method of automatic image correction in an electronic device, according to an embodiment of the present disclosure.

FIG. 13 is a flowchart of a method of automatic image correction in an electronic device, according to an embodiment of the present disclosure.

Referring to FIG. 13, in step 1301, the electronic device 201 may photograph an image by using the camera module 291 under the control of the AP 210.

In step 1303, the electronic device 201 may automatically correct the display direction of the image according to the position of the indicator 413, and may display the photographed image on the display 260 under the control of the AP 210.

Figure 14:
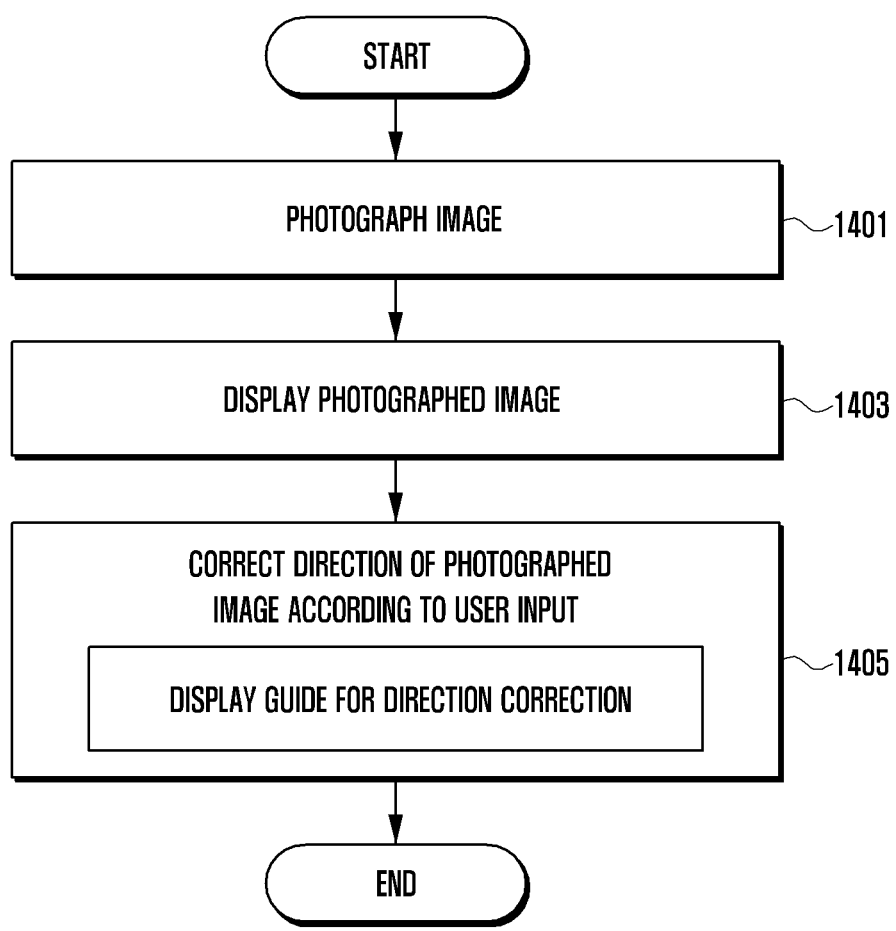
FIG. 14 is a flowchart of a method of manual image correction in an electronic device, according to an embodiment of the present disclosure.

FIG. 14 is a flowchart of a method of manual image correction in an electronic device, according to an embodiment of the present disclosure.

Referring to FIG. 14, in step 1401, the electronic device 201 may photograph an image by using the camera module 291 under the control of the AP 210.

In step 1403, the electronic device 201 may display the photographed image on the display 260 under the control of the AP 210.

In step 1405, the electronic device 201 may correct the direction of the photographed image according to a user input under the control of the AP 210. When correcting the direction of the photographed image according to the user input, the electronic device 201 may display, on the display 260, a guide screen for the correction of the image direction under the control of the AP 210.

Figure 15:
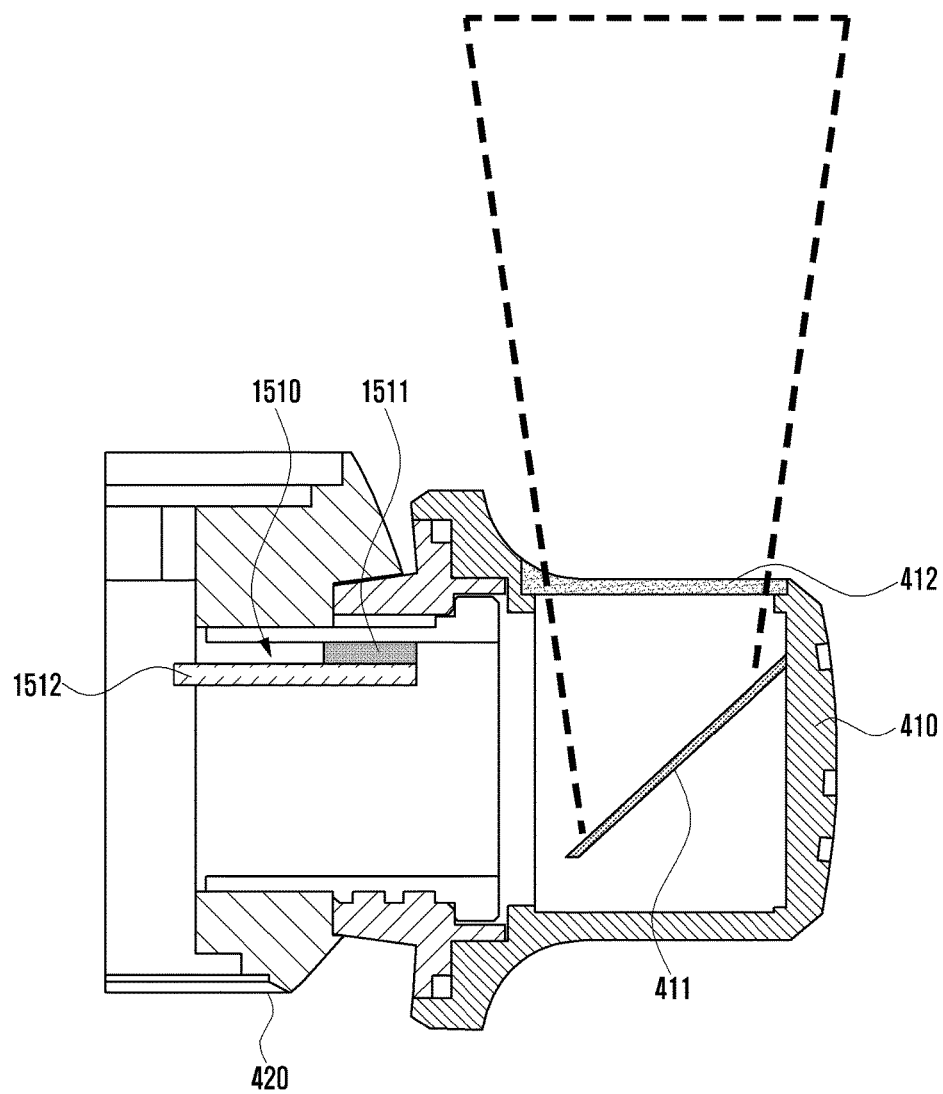
FIG. 15 illustrates a view of a camera and a sensor arranged in the electronic device, according to an embodiment of the present disclosure.

FIG. 15 illustrates a view of a camera and a sensor arranged in the electronic device, according to an embodiment of the present disclosure.

Referring to FIG. 15, the crown 410 of the electronic device 201, according to an embodiment of the present disclosure, is shown. The crown 410 may include the reflector 411 and the camera window 412. The reflector 411 may be configured with a prism or a mirror. The reflector 411 allows light that passes through the camera window 412 to be reflected at a right angle and to then reach the lens barrel 450 and the image sensor 460. In order to allow light passing through the camera window 412 to be reflected at a right angle and to then reach the lens barrel 450 and the image sensor 460, the reflector 411 may be a prism or a mirror that is tilted at an angle of 45 degrees with respect to the camera window 412 or with respect to the lens barrel 450.

The case 420 may include a rotation detecting unit 1510 to detect the rotation of the crown 410. The rotation detecting unit 1510 may be disposed in a portion where the crown 410 and the case 420 are connected to each other. The rotation detecting unit 1510 may include a sensor 1511 that can detect the rotation of the crown 410. The sensor 1511 may detect the rotation or movement of the crown 410 in order to generate an electric signal.

The rotation detecting unit 1510 may further include a circuit unit 1512 that delivers electrical signals between the sensor 1511 and the ISP of the camera module 291 or the processor 210. The circuit unit 1512 may be configured with a flexible printed circuit board (FPCB). The rotation detecting unit 1510 and the sensor 1511 may be included in the crown 410, and may be disposed in a portion where the crown 410 and the case 420 are connected to each other.

Figure 16:
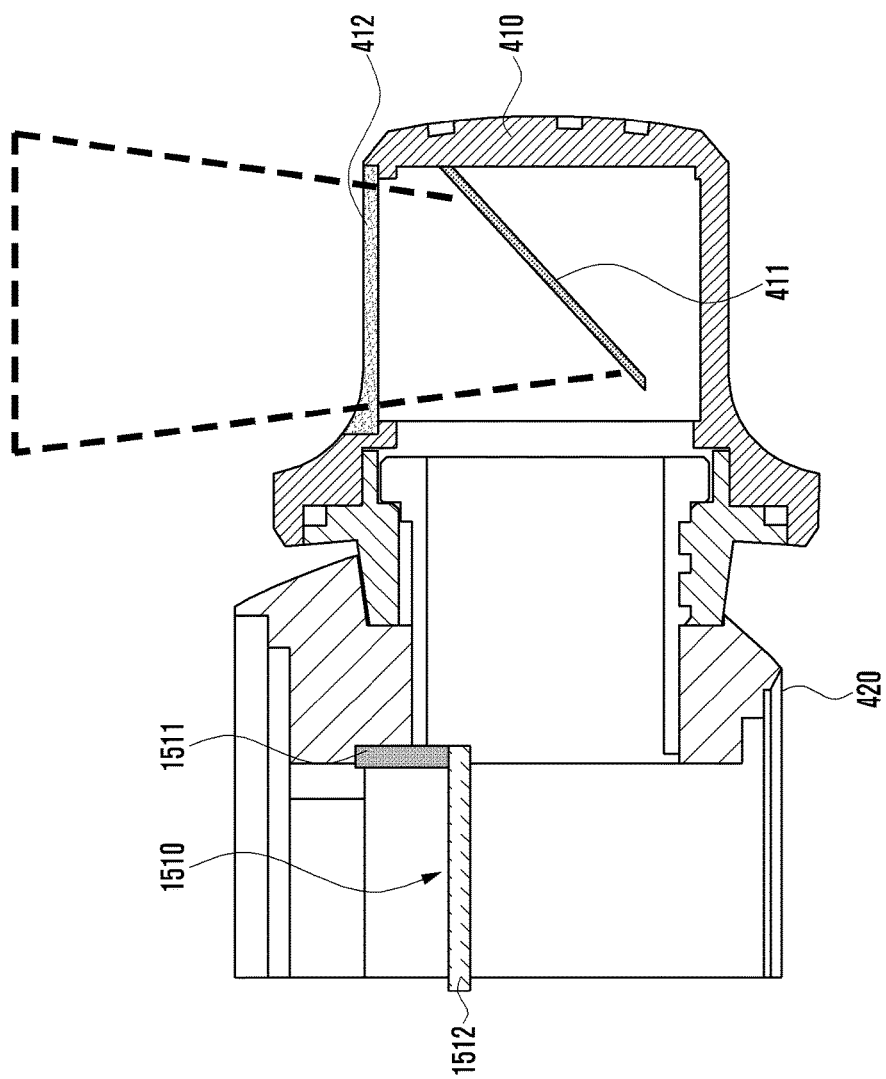
FIG. 16 illustrates a view of a camera and a sensor arranged in the electronic device, according to an embodiment of the present disclosure.

FIG. 16 illustrates a view of a camera and a sensor arranged in the electronic device, according to an embodiment of the present disclosure.

Referring to FIG. 16, the crown 410 of the electronic device 201, according to an embodiment of the present disclosure, is shown. The crown 410 may include the reflector 411 and the camera window 412. Reflector 411 may be configured with a prism or a mirror. The reflector 411 may allow light that passes through the camera window 412 to be reflected at a right angle and to then reach the lens barrel 450 and the image sensor 460. In order to allow light passing through the camera window 412 to be reflected at a right angle and to then reach the lens barrel 450 and the image sensor 460, the reflector 411 may be a prism or a mirror that is tilted at an angle of 45 degrees with respect to the camera window 412 or with respect to the lens barrel 450.

The case 420 may include a rotation detecting unit 1510 to detect the rotation of the crown 410. The rotation detecting unit 1510 may be disposed in a portion where the crown 410 and the case 420 are connected to each other. The rotation detecting unit 1510 may include a sensor 1511 that can detect the rotation of the crown 410. The sensor 1511 may detect the rotation or movement of the crown 410 in order to generate an electric signal.

The rotation detecting unit 1510 may further include a circuit unit 1512 that delivers electrical signals between the sensor 1511 and the ISP of the camera module 291 or the processor 210. The circuit unit 1512 may be configured with a FPCB. The rotation detecting unit 1510 and the sensor 1511 may be disposed in a portion where the crown 410 and the case 420 are connected to each other, and may be disposed in the outside of the crown 410 in order to thereby detect the rotation of the crown 410.

Figure 17:
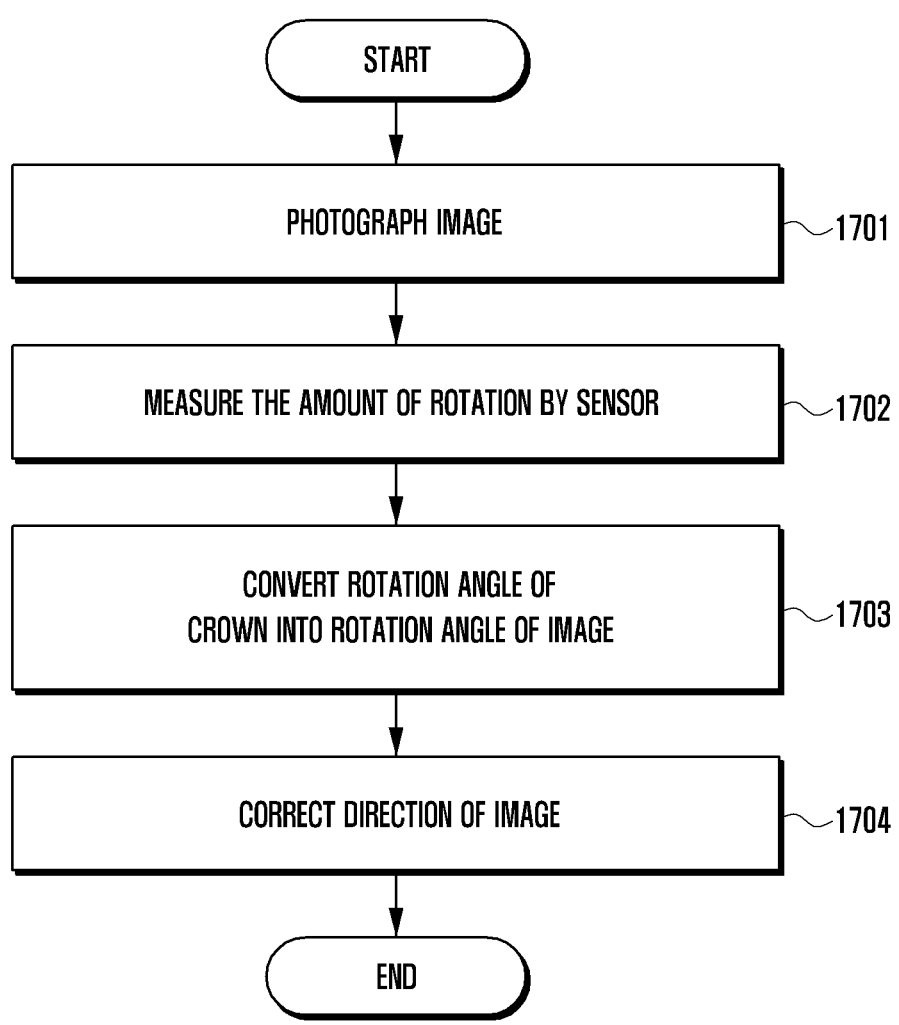
FIG. 17 is a flowchart of a method of automatic image correction in an electronic device, according to an embodiment of the present disclosure.

FIG. 17 is a flowchart of a method of automatic image correction in an electronic device, according to an embodiment of the present disclosure.

Referring to FIG. 17, in step 1701, the electronic device 201 may photograph an image by using the camera module 291 under the control of the AP 210.

In step 1702, the electronic device 201 may measure the amount of rotation of the crown 410 by using the sensor 1511 under the control of the AP 210.

In step 1703, the electronic device 201 may convert the rotation angle of the crown 410, which has been measured by the sensor 1511, into the rotation angle of the image under the control of the AP 210.

In step 1704, the electronic device 201 may correct the direction of the photographed image according to the rotation angle of the image under the control of the AP 210. The operation of correcting the direction of the photographed image may refer to an operation of directing the image in the forward direction without being tilted. In step 1704, the electronic device 201 may display the image whose direction has been corrected through the display 260 under the control of the AP 210.

Figure 18:
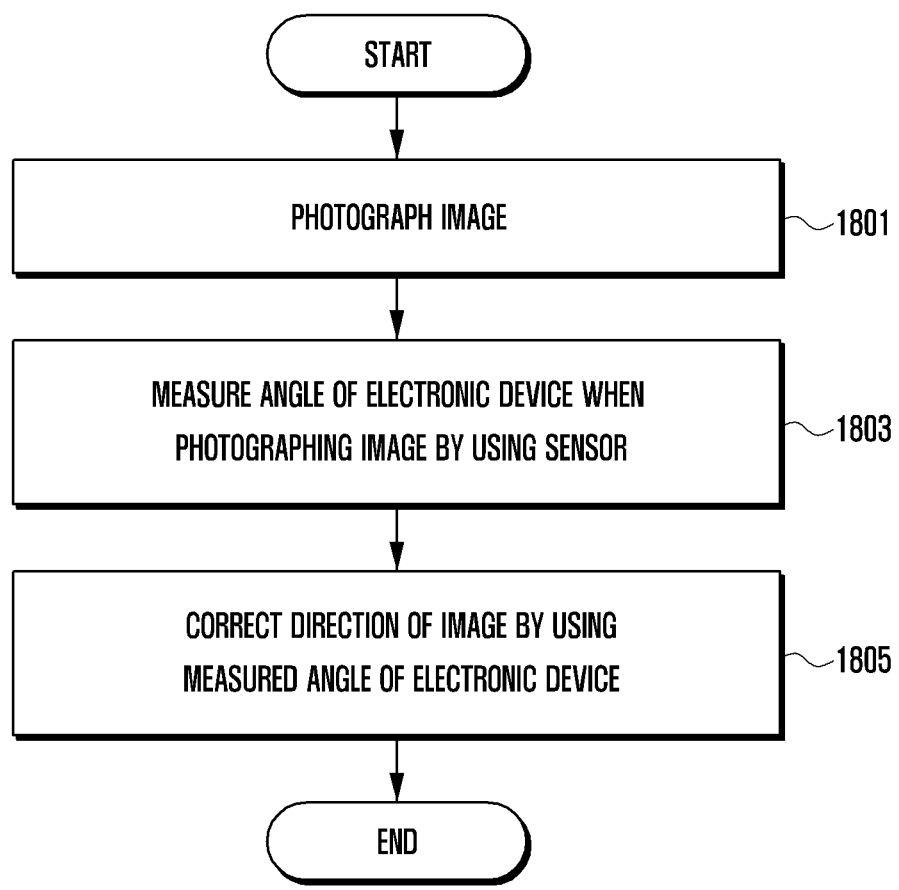
FIG. 18 is a flowchart of a method of automatic image correction in an electronic device, according to an embodiment of the present disclosure.

FIG. 18 is a flowchart of a method of automatic image correction in an electronic device, according to an embodiment of the present disclosure.

Referring to step 1801, the electronic device 201 may photograph an image by using the camera module 291 under the control of the processor 210.

In step 1803, the electronic device 201 may measure the angle (for example, a tilt) of the electronic device 201 by using a sensor (e.g., the gyro sensor 240B of the sensor module 240) under the control of the AP 210 when taking a photo.

In step 1805, the electronic device 201 may correct the direction of the image by using the measured angle of the electronic device 201 under the control of the AP 210. The electronic device 201 may display the image whose direction has been corrected through the display 260 under the control of the processor 210.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

What is claimed is:

1. An electronic device for photographing an image in multiple-directions, the electronic device comprising:
   a case including a display, an image sensor, and a processor; and
   a crown disposed on the case, the crown including a camera window through which light is passed and transmitted to the image sensor, wherein the camera window includes an indicator positioned at a fixed location in at least a portion of the camera window, such that the indicator is photographed by the image sensor when taking a photo,
   wherein the crown is rotatable and when the crown is rotated, the camera window is rotated, and the light passing through the camera window and transmitted to the image sensor changes as a photographing direction of the camera window changes,
   wherein an image corresponding to the light received by the image sensor is shown on the display, and
   wherein the indicator is displayed in a fixed position in the display and indicates a photographing direction of the camera window.

2. The electronic device according to claim 1, wherein the crown comprises a reflector, and the reflector is disposed at an angle of 45 degrees with respect to the camera window.

3. The electronic device according to claim 2, wherein the crown comprises a lens barrel, and the lens barrel focuses the light that passes through the camera window to be transferred to the reflector.

4. The electronic device according to claim 2, wherein the case comprises a lens barrel, and the lens barrel focuses the light that passes through the reflector to be transferred to the image sensor.

5. The electronic device according to claim 1, wherein the indicator is used to correct the display direction of the photographed image.

6. The electronic device according to claim 5, wherein corrects changing the display direction of the photographed image by using the indicator changes the image in the display.

7. The electronic device according to claim 6, wherein the processor displays the corrected image on the display.

8. The electronic device according to claim 1, wherein the case further comprises a rotatable bezel that receives a user input, and
   wherein the process displays a photograph image on the display and corrects a display direction of the photograph image according to a user input, when the user input is received through the rotatable bezel.

9. The electronic device according to claim 8, wherein the processor displays a guide on the display for correcting the display direction of the photograph image.

10. The electronic device according to claim 1, further comprising a rotation detecting unit that detects the rotation of the crown, wherein the rotation detecting unit comprises a sensor for detecting the rotation of the crown, and wherein the processor converts an amount of the rotation of the crown, detected by the sensor of the rotation detecting unit, into a rotation angle of the image and corrects a display direction of the photograph image according to the rotation angle of the image.

11. The electronic device according to claim 2, wherein the reflector is a prism or a mirror.

12. The electronic device according to claim 1, wherein the crown is fitted to the case.

13. The electronic device according to claim 1, wherein the crown is rotatable to receive the user input.

14. The electronic device according to claim 1, wherein the crown has a columnar shape, and
   wherein a section of the crown, which is obtained by cutting the crown in a direction perpendicular to a rotational axis of the crown, has, at least in part, a shape of a circle or a serrated wheel.

15. The electronic device according to claim 14, wherein the camera window is disposed in at least a side portion of the crown.

16. A photographing method of an electronic device comprising a crown disposed on a case, the crown including a camera window, a display, and an image sensor, the method comprising:
   displaying an image on the display from the image sensor receiving light passing through the camera window in the crown;
   correcting a display direction of the image by using an indicator photographed in a fixed position on the camera window indicating a photographing direction of the camera window; and
   displaying the corrected image on the display,
   wherein the case includes the display and the image sensor, and
   wherein the crown is rotatable and when the crown is rotated, the camera window is rotated, and the light passing through the camera window and transmitted to the image sensor changes as the photographing direction of the camera window changes.

17. The method according to claim 16, wherein correcting the display direction of the image comprises automatically correcting the display direction of the image according to a position of the indicator within the image, by directing the indicator in a specific direction,
   wherein the indicator is photographed together with the photographed image when a photo is taken.

18. The method according to claim 16, further comprising:
   generating a photograph of the corrected image,
   wherein generating a photograph comprises removing the indicator from the corrected image.

19. The method according to claim 16, wherein the display direction of the image is changed according to a user input.

20. The method according to claim 16, further comprising:
   measuring an amount of rotation of a crown of the electronic device through a sensor of a rotation detecting unit;
   converting the amount of the rotation of the crown into a rotation angle of the image; and
   correcting the display direction of the photograph image according to the rotation angle of the image, and
   wherein the rotation detecting unit comprises the sensor.

\* \* \* \* \*